United States Patent [19]
Eichinger

[11] Patent Number: 6,024,615
[45] Date of Patent: Feb. 15, 2000

[54] VIBRATION ABSORBING APPARATUS FOR A ROTATING SYSTEM

[75] Inventor: Charles H. Eichinger, Oshkosh, Wis.

[73] Assignee: Brunswick Corporation, Lake Forest, Ill.

[21] Appl. No.: 09/120,595

[22] Filed: Jul. 22, 1998

[51] Int. Cl.[7] .................................................. B63H 1/15
[52] U.S. Cl. ............................................. 440/52; 440/38
[58] Field of Search ................................. 440/49, 52, 67, 440/89, 38; 416/939, 245 A; 74/574; 464/180

[56] References Cited

U.S. PATENT DOCUMENTS

| | | | |
|---|---|---|---|
| 4,044,628 | 8/1977 | Jacks ............................................ | 74/574 |
| 4,200,004 | 4/1980 | Bremer ......................................... | 74/574 |
| 4,590,856 | 5/1986 | Mamberer et al. ........................... | 101/350 |
| 4,637,801 | 1/1987 | Schultz ......................................... | 440/67 |
| 4,734,079 | 3/1988 | Viets ............................................. | 464/180 |
| 4,884,666 | 12/1989 | Stahl ........................................... | 188/378 |
| 4,905,956 | 3/1990 | Zemlicka et al. ........................... | 248/562 |
| 4,955,833 | 9/1990 | Lam et al. ................................... | 440/49 |
| 4,962,677 | 10/1990 | Withers ........................................ | 74/574 |
| 5,095,786 | 3/1992 | Bellinghausen ............................. | 82/112 |
| 5,231,893 | 8/1993 | Sisco et al. .................................. | 74/574 |

*Primary Examiner*—Ed Swinehart
*Attorney, Agent, or Firm*—William D. Lanyi

[57] ABSTRACT

A vibration dampening system incorporates an inertia mass that is disposed within a hollow portion of an impeller structure. The inertia mass is attached to one or more elastomeric members which are, in turn, attached to an inside surface of a tubular portion of the impeller structure. The annular inertia mass and its elastomeric legs are particularly designed to dampen and counteract a particular frequency at which the propulsion system vibrates when the internal combustion engine is operated at idle speed.

1 Claim, 4 Drawing Sheets

VIBRATION ABSORBING APPARATUS FOR A ROTATING SYSTEM

BACKGROUND OF THE INVENTION

1. Field of the Invention

The present invention generally relates to a vibration absorbing device, and, more particularly, to an annular mass which is attached to the inside surface of a tubular structure, such as an impeller.

2. Description of the Prior Art

Whenever a rotatable device is driven by a source of motive power, such as an internal combustion engine, there are many possible sources of vibration that can cause noise at certain frequencies. For example, if the rotatable device, such as an impeller for a marine propulsion system, is connected to the source of motive power by shafts, splines, and gears, variations in torque transmitted from the source of motive power to the rotatable object can cause vibration and noise. Those skilled in the art are familiar with many techniques that can be used to dampen vibration and reduce noise.

U.S. Pat. No. 4,884,666, which issued to Stahl on Dec. 5, 1989, discloses a torsional damper and mounting adapter. The assembly for dampening shaft vibration and noise comprises an annular torsional damper which is fixedly mounted to a cylindrical flange of a mounting adapter. The opposite ends of the adapter are cylindrically shaped and extend into adjacent ends of a pair of shafts which are affixed thereto.

U.S. Pat. No. 5,231,893, which issued to Sisco et al on Aug. 3, 1993, describes a dual mode damper. The crankshaft vibration damper is provided with a unique elastomer member that is positioned between a hub and an outer annular inertia member. The hub is configured for connection to the accessory drive end of the crankshaft. The inertia member may or may not be grooved to accept an accessory drive belt. The resilient elastomer member is dimensionally and chemically developed to dampen torsional and bending vibrations when assembled between a corresponding curved hub and inertia member. The radically outward or inward curvature of the hub and inertia member is selected to be sufficient to effectively reduce crankshaft bending vibration.

U.S. Pat. No. 4,905,956, which issued to Zemlicka et al on Mar. 6, 1990, discloses a fluid mounting system for a marine engine. The mounting system includes a combination of a solid elastomer and a fluid dampening means to significantly improve vibration isolation and cushioning under normal shock loads. The fluid dampening means is constructed to lock up and become inoperative under heavy shock loads to protect the mount against overload failure. An improved mounting system utilizing the fluid mounts optimizes the performance thereof.

U.S. Pat. No. 4,200,004, which issued to Bremer on Apr. 29, 1980, discloses a zero slip torsional vibration damper. The damper has an inertia ring coupled to a hub by means of an elastomer member. The hub is attached to a shaft which is subject to torsional vibrations. The radically outermost portion of the elastomer carries angularly spaced pockets into which a damper liquid of high viscosity is placed. The specific improvement of this device resides in thickening the radically innermost portion of the elastomer, relative to the radically outerpost portion. In assembling the damper, the radically innermost elastomer portions are compressed while the portions of lesser thickness are not compressed. A thin film of viscous liquid is adjacent the elastomer portions of lesser thickness and thus functions as a viscous damper while the thicker elastomer portions function to elastically dampen torsional vibrations.

U.S. Pat. No. 5,095,786, which issued to Bellinghausen et al, on Mar. 17, 1992, describes a method in apparatus for dampening brake lathe vibration. The device is directed to a brake lathe having a device to eliminate or reduce vibration. Various types of dampers can be mounted on an arbor shaft of the lathe.

U.S. Pat. No. 4,962,677, which issued to Withers on Oct. 16, 1990, describes a harmonic balancer. A torsional vibration damper is used to dampen harmonic vibration frequencies set up in crankshafts of reciprocating internal combustion engines. The balancer has a hub section to be fitted to the crankshaft requiring balancing. The hub section defines an outwardly directed peripheral phase which has an annular ring of elastomeric material received thereover. The balancer also has an inertial ring press fitted over the elastomeric material ring with an inwardly directed phase of the inertia ring engaging the elastomeric material. The inertia ring includes an inwardly directed member which is located at one axial end of the inertia ring and has a free end located at a radial distance from the axis of rotation of the shaft being balanced less than the radial distance of the peripheral face of the hub section from the axis of rotation. It also includes a plastically deformable member that is located at the other axial end of the inertia ring. The deformable member has a free end in an undeformed state spaced from the axis of rotation a distance no less than the radial distance between the axis of rotation and an outer surface of the elastomeric material. The free end of the deformable member is located, in a deformed state, at a radial distance from the axis of rotation which is less than the radial distance of the peripheral face of the hub section from the axis of rotation of the balancer.

U.S. Pat. No. 4,590,856, which issued to Mamberer et al on May 27, 1986, discloses a lifter-type inker for rotary printing machines including rotational shock dampening means. In order to prevent printing of an imperfect copy by a printing machine having a lifter-type inker, which is caused by cyclically recurring rotary oscillations or vibrations, the breaking torque introduced upon contact of a lifter roller with a first milling and distribution roller of the inker is prevented from propagating through the gearing drive of the respective ink rollers. To prevent such propagation, the first milling and distributing roller is yieldingly driven at machine speed, for example by a frictional drive, transmitted through an elastic surface of a soft roller in frictional drive engagement with the first milling and distributing roller as well as a positively driven subsequent milling and distributing roller, or a circumferencially resilient yielding coupling, is interposed between the driveshaft element for the first milling and distributing roller and a positive gear drive. Preferably, the inertia of the first milling and distributing roller is high with respect to that of the lift roller and is, for example, enhanced by a flywheel.

U.S. Pat. No. 4,044,628, which issued to Jacks on Aug. 30, 1977, discloses a torsional damper for reducing the vibrations produced when a shaft is driven by the intermittent application of a discontinuous force thereto. An example of this application is the crankshaft of an internal combustion engine. The damper comprises an integrally formed disc-like mass having three concentric zones, namely an inner central zone, an outer annular zone, and an intermediate spring zone there between. The spring zone includes narrow, elongated, spirally arranged, overlapping slots extending axially through the disc and radically between the inner and outer zones to provide spirally arranged overlapping webbed portions which act as torsional springs or shock absorbers due to an inherent resiliency. The spirally slotted damper is formed as an integral unit by casting it from a metal such as cast iron, with spiral slots having a predetermined size and shape to provide the desired damping effect.

In certain applications of rotating equipment, it is difficult to provide sufficient space for a damper to reduce vibration and noise transmitted from an internal combustion engine to a rotatable object, such as an impeller of a marine drive system. Spatial restrictions often inhibit the use of known vibration dampening means attached to the crankshaft of the internal combustion engine or the driveshaft of the impeller. It would therefore would be significantly beneficial if a means could be provided to dampen the vibration and noise transmitted to an impeller of a marine drive system without requiring space to be diverted to the torsional dampening system.

SUMMARY OF THE INVENTION

A rotating system made in accordance with the present invention comprises a rotatable shaft and a rotatable object attached for rotation to the rotatable shaft. The rotatable shaft can be attached to an impeller device for a marine propulsion system. The impeller is the rotatable object in a particularly preferred embodiment of the present invention. A mass is attached for rotation with the rotatable shaft by one or more elastomeric members.

In a particularly preferred embodiment of the present invention, the impeller structure is generally tubular and has an inside surface. One or more elastomeric members are attached to the inside surface of the mass and can be attached between the inside surface and the mass. The mass can be an annular member disposed in coaxial relation with the rotatable shaft. The one or more elastomeric members can be three elastomeric legs which extend radially between the inside surface of the impeller and the inertia mass.

BRIEF DESCRIPTION OF THE DRAWINGS

The present invention will be more fully and clearly understood from a reading of the description of the preferred embodiment in conjunction with the drawings, in which.

DESCRIPTION OF THE PREFERRED EMBODIMENT

Figure 1:
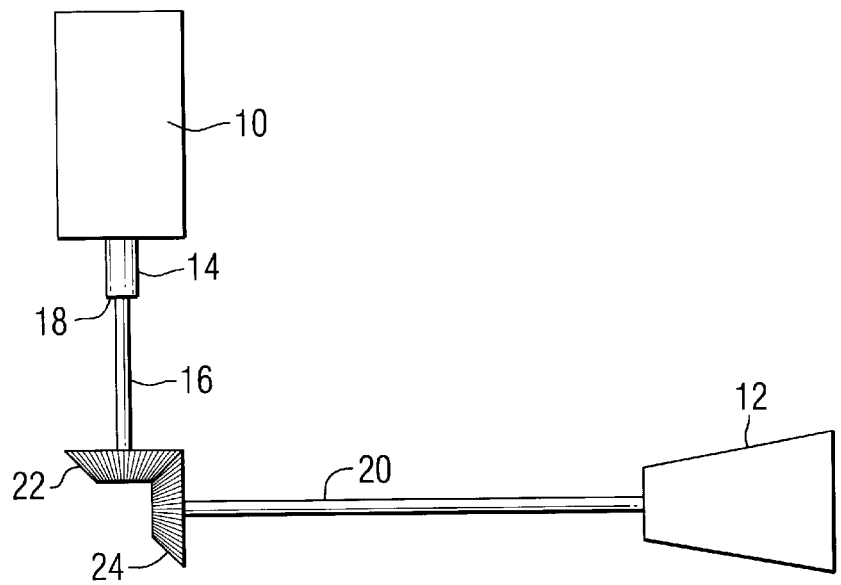
FIG. 1 is a highly schematic representation of a marine propulsion system.

Throughout the description of the preferred embodiment, like components will be identified by like reference numerals.

FIG. 1 is a highly schematic representation of a drive system in which a source of motive power, such as an internal combustion engine 10, is connected to a rotatable object, such as an impeller 12. In a system of this type, the crankshaft 14 of the internal combustion engine 10 can be attached to a driveshaft 16 with a splined connection 18. The driveshaft 16 can be connected in torque transmitting relation with an impeller shaft 20 through a gearset which can comprise bevel gears such as those identified by reference numerals 22 and 24. In a system such as that schematically represented in FIG. 1, variations in torque provided by the internal combustion engine 10 can cause vibration and noise as the torque is transmitted to the impeller 12. These torsional variations can cause chatter at the spline coupling 18 if any gaps between the spline teeth exist. Similarly, if the gears, 22 and 24, are not tightly meshed together, torsional variations can cause the teeth to impact each other with relative reciprocating motion.

It should be understood that the system shown in FIG. 1 is exemplary and intended to illustrate a typical arrangement of a source of motive power and a rotatable object and to show various sources of vibration and noise that can be caused if variations in torque output from the source of motive power is experienced.

If an internal combustion engine 10 is used as the source of motive power, the compression and expansion phases of the engine cycle can introduce torsional variations in the crankshaft 14. These changes in torque are then transmitted through the output shaft 16, or pinion shaft 16, to a pinion gear 22. An output gear 24 is arranged in meshing relation with the pinion gear 22 and the torsional variations are then transmitted to the impeller shaft 20 and the impeller 12.

Figure 2:
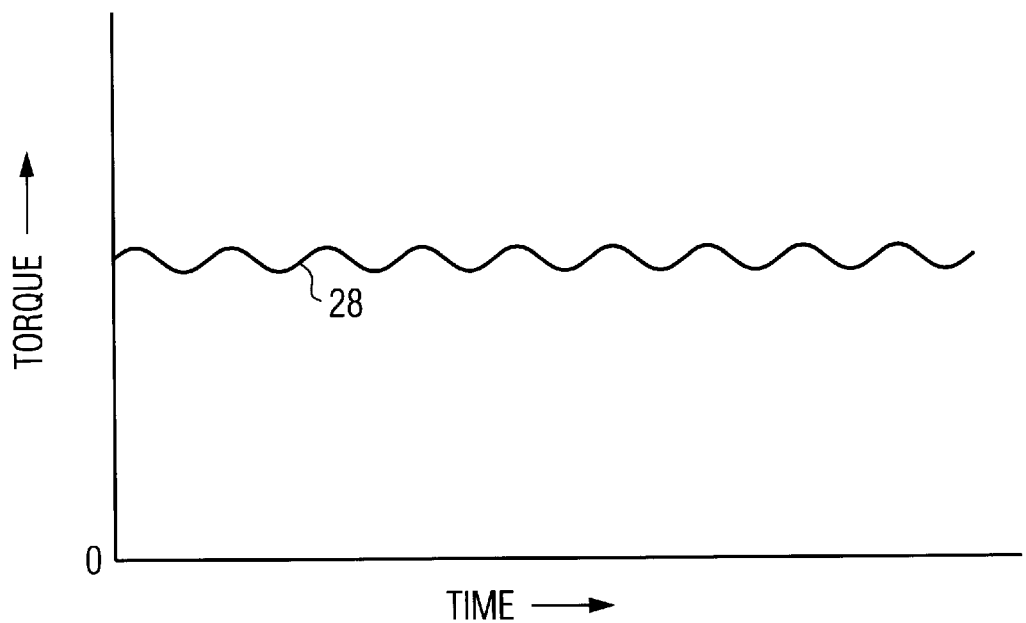
FIG. 2 represents a torsional variation in a rotatable drive system.

FIG. 2 is a graphical representation of the torque output by the internal combustion engine 12 as a function of time. As can be seen, curve 28 is a varying magnitude that is generally sinusoidal in shape. During the compression stroke of each piston, the torque decreases and the output shaft 14 decelerates. Conversely, during the expansion stroke of each piston, the torque increases and the output shaft 14 accelerates. The frequency of the variations of curve 28 can be determined in certain applications by the equation:

$$f = N(R)(60) \qquad (1)$$

where N is the number of compression strokes per revolution of the internal combustion engine 10, R is the rpm of the engine output shaft 14 and the result is multiplied by 60 to convert to hertz. Equation 1 may not be precisely accurate in every application, but the basic cause of the varying torsional output 28 is typically related to the compression and expansion strokes of the pistons. Usually, the variations in torque magnitude are much less than the absolute value of the torque. However, when the engine is operating at idle speed, the output torque might be significantly reduced to cause the condition represented in FIG. 3 to exist.

Figure 3:
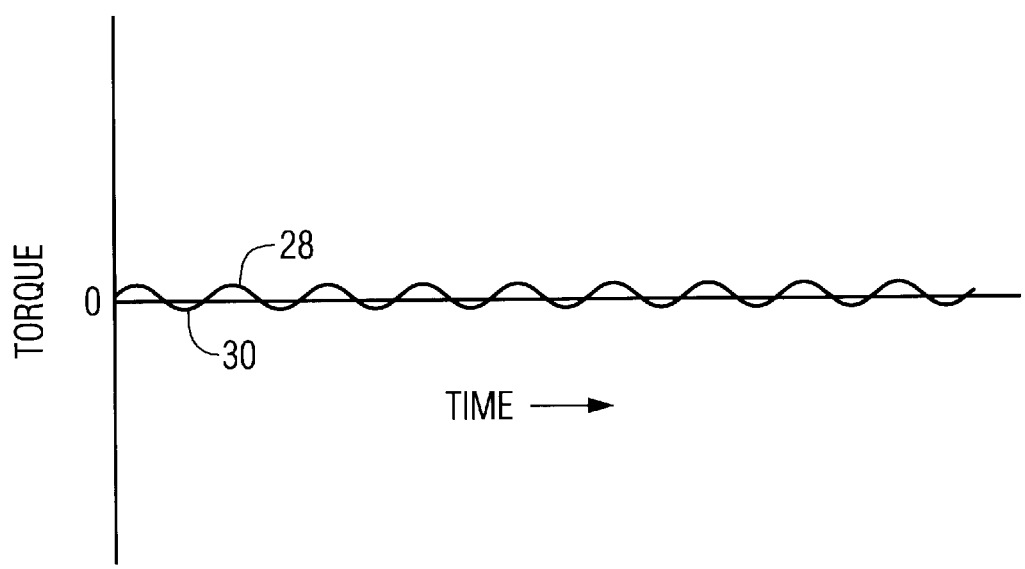
FIG. 3 shows a torsional variation at idle speed in which a torque reversal occurs.

FIG. 3 shows the output torque curve 28 when the engine is operating at low torque outputs. As can be seen, during the compression strokes, the torque curve 28 reaches its minimum values 30 which can be negative. When this occurs, the torque reversal can cause the spline teeth to actually disengage and reengage during each torque reversal. Similarly, the gear teeth of gears 22 and 24 shown in FIG. 1 can disengage and reengage if sufficient backlash is present. With the spline teeth and gear teeth disengaging and reengaging when each piston hinges from a compression stroke to an expansion stroke, the noise created by these actions can be excessive. This noise and vibration is transmitted through the torque transmitting arrangement shown in FIG. 1 and can be harmful to the components of the system in addition to causing excessive noise and vibration.

Figure 4:
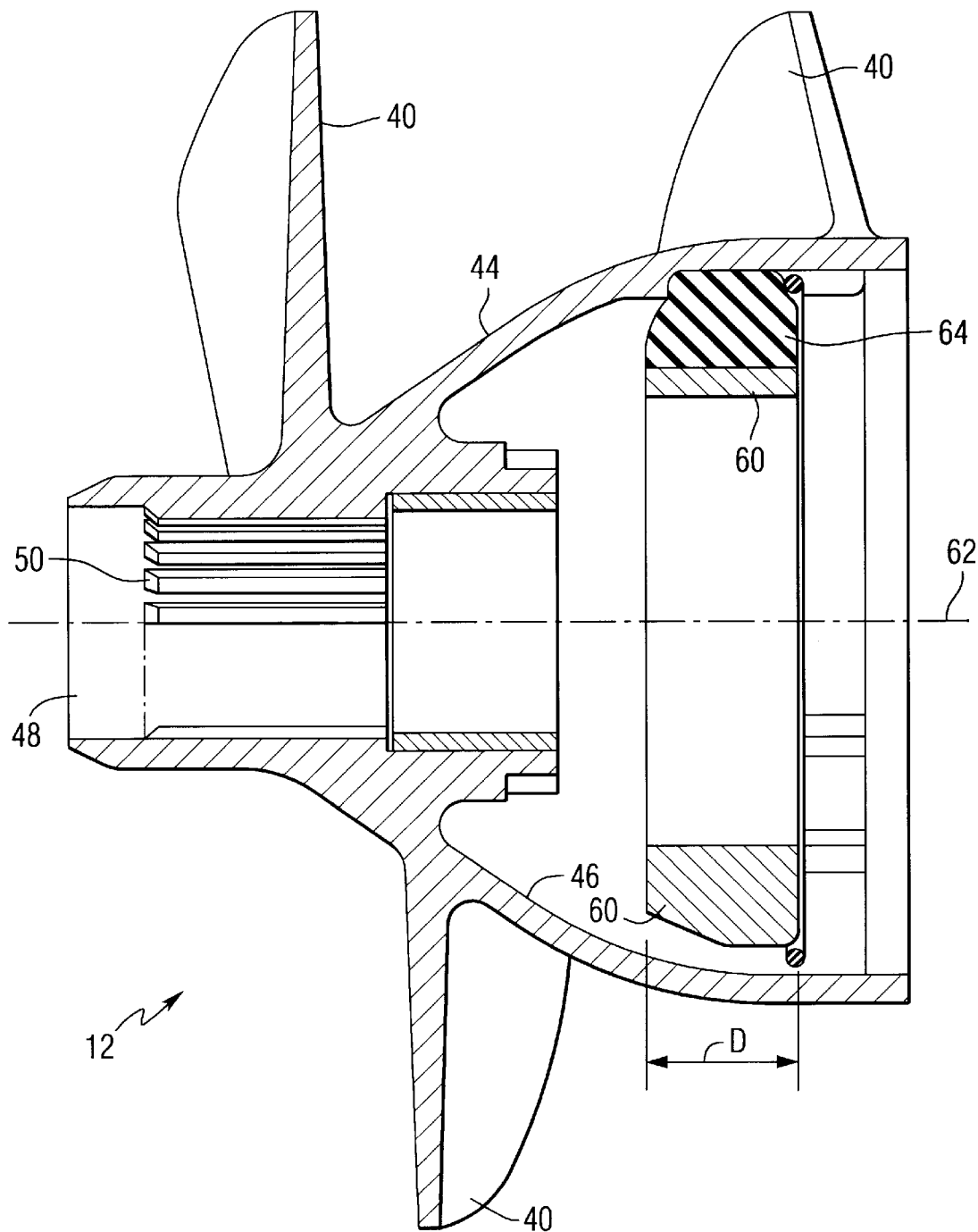
FIG. 4 is a side sectional view of an impeller with which the present invention can be used.

FIG. 4 illustrates an impeller 12 which is equipped with a vibration dampening system made in accordance with the present invention. The impeller 12 is a more detailed representation of the impeller 12 illustrated in FIG. 1 and described above. It has a blade 40 attached to a hub portion 44. As illustrated in FIG. 4, the hub portion 44 is generally tubular in shape and has an inside surface 46. The forward portion 48 of the impeller is shaped to receive the impeller shaft 20 described above in conjunction with FIG. 1. It can be provided with splines 50 which are shaped to receive and engage spline teeth on the impeller shaft 20. An inertia mass 60 is held in place relative to the central axis 62 of the impeller 12 by a plurality of elastomeric legs 64. One or more of the elastomeric legs 64 are attached to both the inertia mass 60 and the inside surface 46 of the impeller 12. In a particularly preferred embodiment of the present invention, three legs 64 are provided between the outer cylindrical surface of the inertia mass 60 and the cylindrical inside surface 46.

The natural frequency of the inertia mass 60 can be described by:

$$f_n = (K/M)^{1/2} \qquad (2)$$

in which K is the torsional spring rate of the elastomeric legs 64 and M is the rotational inertia of the mass 60. The natural frequency $f_n$ can be measured when the system, such as that shown in FIG. 1, is operated. In typical applications pertaining to marine propulsion systems, the frequency of variations in the torsional curve 28 are approximately 50 Hertz when the internal combustion engine 10 is operated at idle speed. This is also the time when the absolute magnitude of torque is at a minimum magnitude which can lead to the deleterious situation represented in FIG. 3. Therefore, the natural frequency in equation 2 is generally known. The rotational inertia M of the device is typically set to a magnitude that is approximately 10% to 50% of the rotating mass, or impeller structure 12. For a structure such as that shown in FIG. 5, the rotational inertia is generally calculated as a function of π, the radius of the annular structure taken to the 4th power, the depth of the annular structure, as illustrated by reference letter D in FIG. 4, and the density of the material used as the inertia mass 60. In an annular shape such as that shown in FIG. 5, the inside diameter ID and outside diameter OD are used to calculate the net moment of inertia for the structure, with consideration for the internal open space of the annulus. These equations are well known to those skilled in the art and will not be described in detail herein. The torsional spring rate K of the system is a function of the height H, the width W, and the depth D of the legs 64 in combination with an effective radius R from the center of rotation 62 to an effective center of each leg 64.

Figure 5:
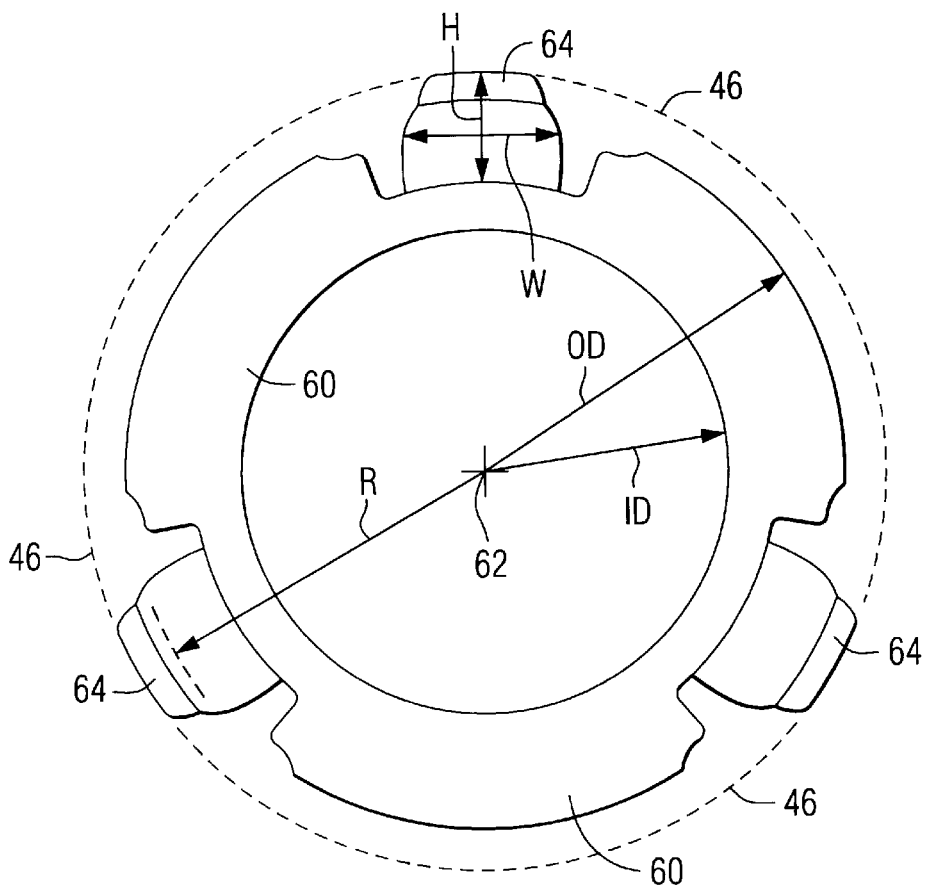
FIG. 5 shows the inertia mass and elastomeric support system of a preferred embodiment of the present invention.

With reference to equation 2 above, it can therefore be seen that a torsional spring rate K and a rotational moment of inertia M can be selected for the device shown in FIG. 5 which results in a natural frequency $f_n$ that matches the desired frequency at which the maximum vibrational response occurs in the system shown in FIG. 1. It should be clearly understood that the present invention is not limited to specific torsional spring rates K or specific rotational moments of inertia M. Instead, the variables in equation 2 can be used as tools to appropriately fashion a vibration dampening structure which is suitable for a particular application and which fits into the allowed space.

In FIG. 5, dashed line 46 represents the inside surface 46 described above in conjunction with FIG. 4. The radially outer surface of each leg 64 presses against the inside surface 46 and supports the inertia mass 60 in a coaxial relationship with the center line 62 about which the impeller 12 rotates.

The present invention, as illustrated in FIG. 5, comprises three legs 64 made of the elastomeric material, such as natural rubber. It is desirable to achieve a relatively low natural frequency to solve the problems which can be inherent in marine propulsion systems driven by an internal combustion engine.

It is also desirable to dampen the vibrations that occur when the internal combustion engine is operated at idle speed. With reference to equation 2, the natural frequency can be lowered either by lowering the torsional spring rate K or by raising the rotational moment of inertia M. A softer elastomeric material can be helpful in lowering the torsional spring rate K, but it is necessary to maintain sufficient rigidity in the legs 64 to prevent the inertia mass 60 from wobbling off center with respect to the center line 62. If the center of gravity of the inertia mass 60 moves sufficiently away from the axis 62, the entire annular structure of the inertia mass 60 can be forced against one portion of the inside surface 46 and create a significant imbalance situation. This is particularly true since the disturbing force is a squared function of the distance between the center of gravity of the inertia mass 60 and the center line 62. These restrictions necessitate the use of an elastomeric material which is stiffer than would otherwise be desirable if the only goal of the device was to lower the natural frequency. The material selected as the elastomeric material of the legs 64 should also exhibit a certain degree of damping when used in the structure. Different materials exhibit different damping qualities. An elastomeric material, for example, exhibits a much higher damping quality than a metal. An elastomeric material is preferable in a preferred embodiment of the present invention because its internal inefficiency converts kinetic energy to heat and thus decreases the response to vibration.

Figure 6:
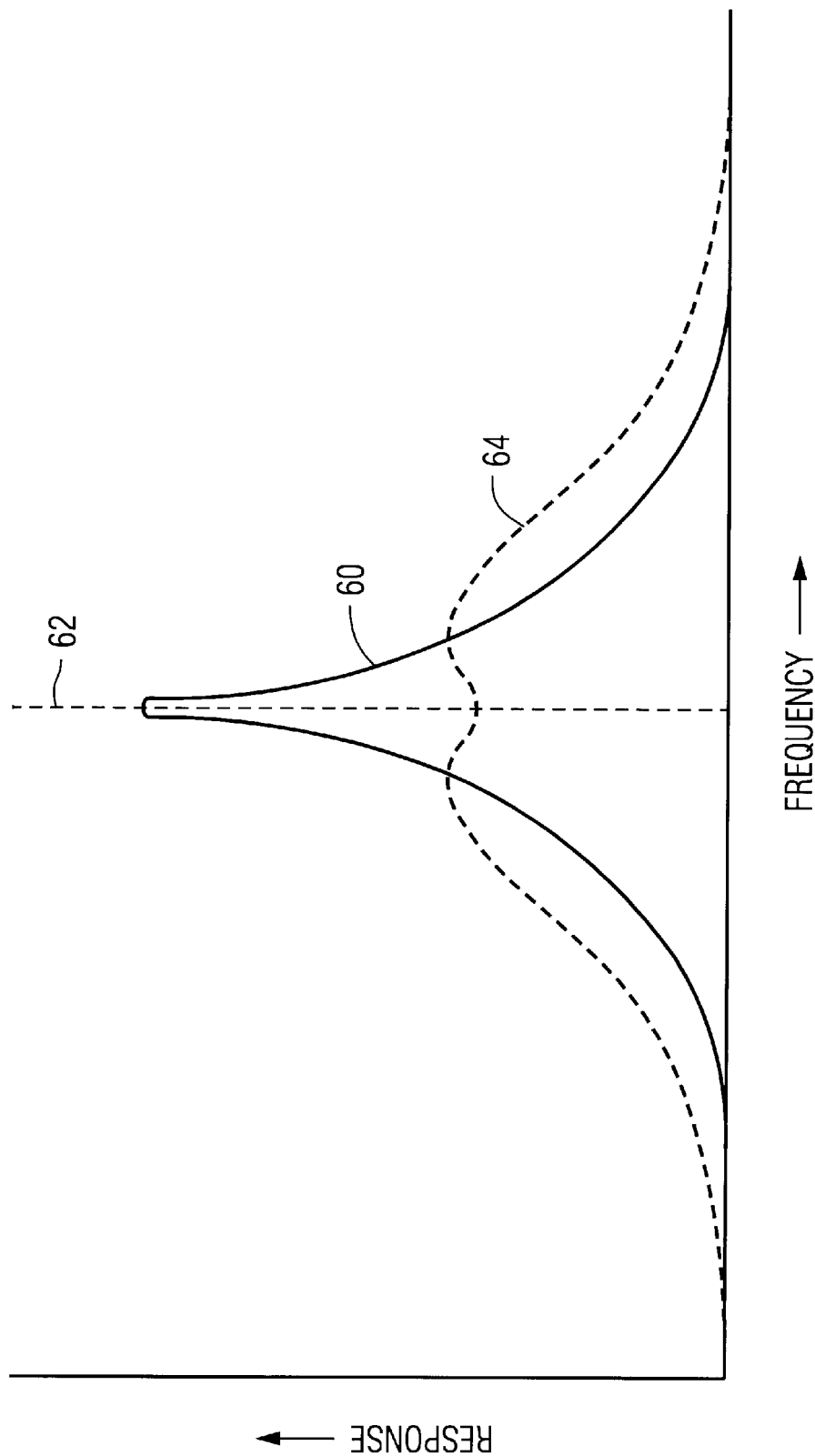
FIG. 6 is a graphical representation showing the responses of an undamped system and a system damped with the present invention.

FIG. 6 illustrates how the present invention can dampen the response to vibration at a preselected frequency, such as the observed frequency at which a marine propulsion system exhibits maximum vibration at idle speed. It should be understood that the graphical representation in FIG. 6 is not empirically derived but, instead, is exemplary to show a hypothetical change in the response of a rotating system when the present invention is used. The response 60 of an undamped system can reach significant magnitudes of response at the resonant frequency 62 of the system. Excessive vibration and noise would be caused by the excessive response 60 unless some action is taken to dampen the vibration. As a result of a device such as the present invention described above, the peak value of the response is significantly reduced and the response is dispersed over a larger frequency range. This is represented by dashed line 64. A marine propulsion system that responds in the manner represented by dashed line 64 is significantly preferable over that one that responds as one represented by line 60 in FIG. 6.

With reference to FIG. 3, it should be understood that the use of a device such as the present invention would decrease the amplitude of variation in the torque curve 28 and avoid the negative torque pulses 30. As a result, the torque variation would be significantly reduced and would remain positive at all times. This elimination of the torque reversals 30 also eliminates the disengagement and reengagement of the spline teeth and gear teeth. As a result, the vibration and noise of the drive system is significantly reduced.

Although the present invention has been described with particular specificity and illustrated to show a particularly preferred embodiment of the present invention, it should be understood that alternative embodiments are also within its scope.

What is claimed is:

1. A rotating marine propulsion system, comprising:

a rotatable shaft;

an impeller attached for rotation with said rotatable shaft, said impeller being generally tubular and having an inside surface; and a mass attached for rotation with said rotatable shaft by three or more elastomeric members, each of said three or more elastomeric members being attached between said inside surface and said mass, each of said three or more elastomeric members being in noncontact association with each other, said mass being disposed radially inward from said inside surface of said impeller, said mass being an annular member disposed in coaxial relation with said rotatable shaft.

* * * * *